June 18, 1963 W. E. SPLINTER 3,093,949
TOBACCO HARVESTER
Filed June 9, 1961 2 Sheets-Sheet 2
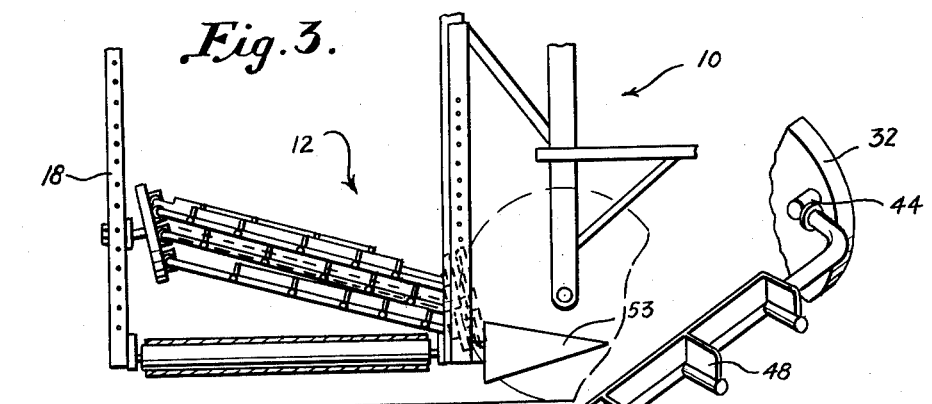
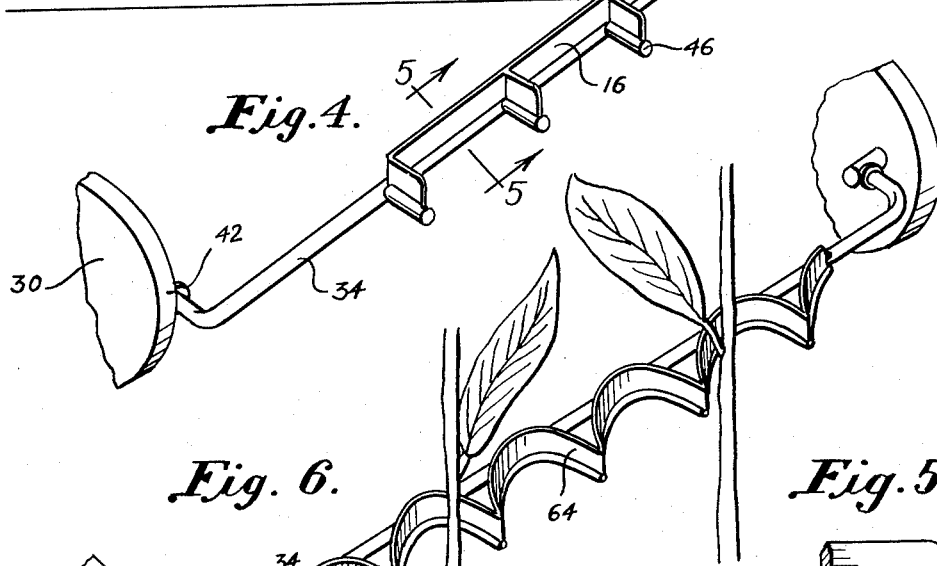
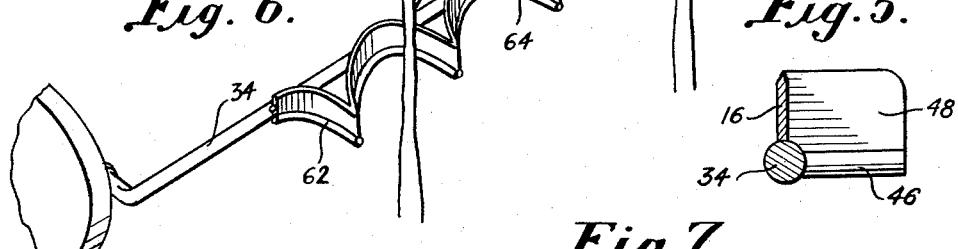
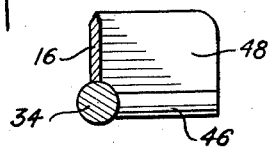
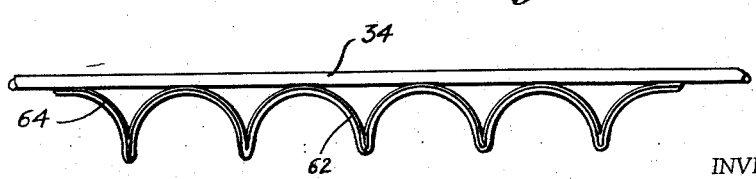
INVENTOR
William E. Splinter
BY Cushman, Darby & Cushman
ATTORNEYS

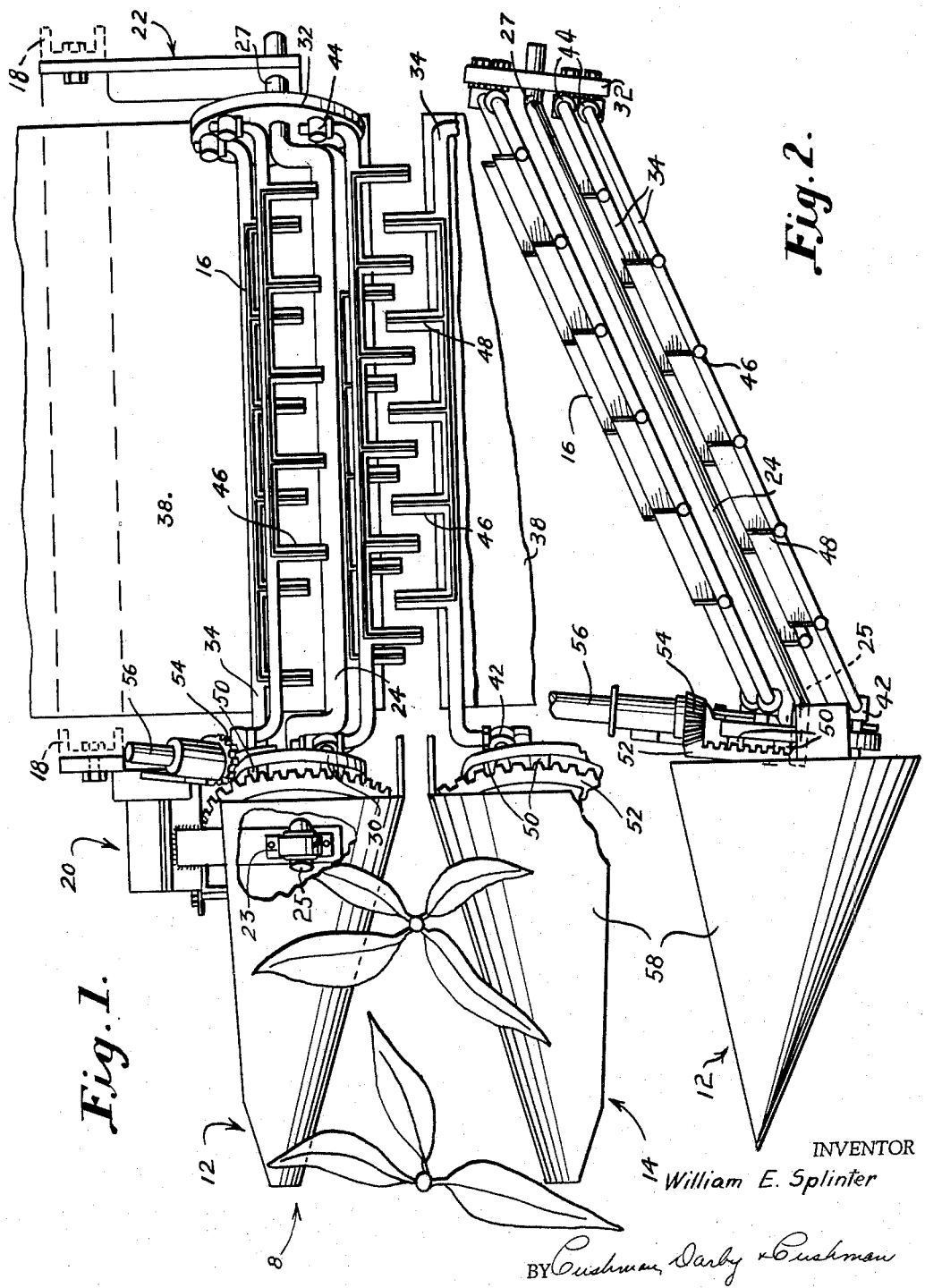

United States Patent Office 3,093,949
Patented June 18, 1963

3,093,949
TOBACCO HARVESTER
William E. Splinter, Raleigh, N.C., assignor to Research
Corporation, a corporation of New York
Filed June 9, 1961, Ser. No. 116,096
8 Claims. (Cl. 56—27.5)

This invention relates to tobacco harvesters and more particularly to a device for priming tobacco plants having improved defoliating means incorporated therein.

The prior art is composed of a number of leaf defoliating devices including those which deliver a downward blow at the junction of the leaf with the stalk of the plant, and others which remove the tobacco leaves in a downward wiping motion.

The tobacco harvester herein disclosed is drawn specifically to a defoliating mechanism particularly adapted to removing tobacco leaves from the tips of the plant. Such a device has been designed to overcome the previous difficulties encountered when removing such leaves. These difficulties included instances where the stalk of the plant itself failed, or the leaf stems collapsed and hung limp from the stalk rather than breaking clearly therefrom, and where the stalk, because of its non-rigidity, was merely bent away from a defoliating position. A device as disclosed herein has been successfully used to overcome these difficulties.

The principle of cutting the tobacco leaves in this invention consists of cutting the leaf from the stalk at the leaf node by means of a sharp blade using an upward motion. The cutting blade is first moved inwardly toward the stalk then upwardly severing the leaf from the stalk, and then withdrawn from the stalk. A number of blades are mounted in echelon about an axis generally parallel to the rows of tobacco plants so as to continually remove the leaves from a series of plants as the defoliating device is moved along.

The knives are mounted upon elongated rods such that, in the previously described motion, the rods will engage the stalk and knife blades will cut the tobacco leaves at the nodes thereof without damaging the stalk of the tobacco plant. It has been found that the leaf stem projects from the stalk at the leaf node at an angle of approximately 52 degrees from the horizontal. It has been further noted that the diameter of the leaf stem at that point is in the neighborhood of three-fourths of an inch. A blade one inch in depth therefore will cut through the leaf node before the rod element backing the blade will engage the cut section; in this manner the leaf is cut cleanly from the stalk rather than being partly torn therefrom. The diameter of the rod element backing the cutting blade is also determined by the degree of deflection of the stalk from the vertical, and should be of such a diameter that the cutting blade will not encounter the stalk while in its circular motion. Nearly all stalks can be mechanically oriented into the defoliating mechanism within 10 degrees of vertical, and a rod element one-half inch in diameter is sufficient to keep the knife from slicing the tobacco stalk.

Leaves which grow from the stalk in a direction generally perpendicular to the row of plants are removed by the means of knives mounted along the top of the longitudinal bar or rod of the echelon unit. Leaves which grow in a direction generally parallel to the row are removed by knives mounted on fingers which project outwardly at spaced intervals along the longitudinal bar. A further improved cutter having a series of knives shaped in a U or semi-circular manner is attached to remove those leaves which project from the tobacco stalk at angles between those parallel to the row and those perpendicular to the row.

The defoliating unit is mounted so as to remove the lowest leaves first and subsequently those leaves which grow higher up on the stalk. The motion of a knife unit is such as to remove the leaf and carry it up over the defoliating unit and onto a suitable conveyor, thereby removing the leaf from the unit before cutting the next leaf.

Although the defoliating means of the present invention has been designed primarily to remove leaves from the tip of the stalk, it has been found that the device is suitable for removing leaves at all other levels of the tobacco stalk as well. It has further been discovered from use that the device of the present invention will remove leaves from the stalk with less damage to the leaves than is presently the case when employing hand operations. Also, the device will remove a greater percentage of leaves from the upper half of the stalk from the devices of the prior art, and is particularly adapted to removing tip leaves as noted hereinbefore. Losses of leaves from the elevator after the leaf is removed from the plant have been greatly reduced, and testing has indicated that the device is not appreciably sensitive to the presence of sucker nubs. Furthermore, the device may be operated at ground speeds of up to at least two miles per hour without increase in damage to or loss of the tobacco.

Accordingly, an object of the present invention is the provision of a device capable of removing the leaves from a tobacco stalk by means of an upward circular cutting motion.

A further object of the present invention is to provide means to sever the leaf from a tobacco plant including a knife unit cutting upwardly in a translational motion.

Another object of the present invention is the provision of means to more easily remove the tobacco leaves to a conveyor for carriage to a collection station.

Still a further object of this invention is the provision of a leaf defoliating means which moves first into engagement with the tobacco stalk, then moves upwardly cutting the tobacco stem from the stalk, then finally moves out of engagement from the stalk carrying the severed tobacco leaf to a conveyor for carriage to a collection station.

Yet another object of this invention is to provide means for severing the tobacco leaves from the stalk at the tip end without causing the stalk failure and breakage of the leaf stem.

Yet another object of this invention is the provision of means for cutting the leaves cleanly from the stalk without tearing them partially therefrom.

These and other objects of the present invention will become more apparent during the course of the following detailed description and appended claims.

This invention may best be understood with reference to the accompanying drawings wherein an illustrative embodiment is shown, wherein:

FIGURE 1 is a top plan view of the defoliating mechanism embodying the principles of the present invention;

FIGURE 2 is a side elevational view of the device shown in FIGURE 1, looking outwardly theretoward from the line of a tobacco row;

FIGURE 3 is a side elevational view, with parts broken away and shown in section, of the defoliating mechanism mounted on a propelling vehicle;

FIGURE 4 is a perspective view showing one of the cutting elements;

FIGURE 5 is a cross-sectional view taken along the lines 5—5 of FIGURE 4;

FIGURE 6 is a perspective view of a modification of the cutting element; and

FIGURE 7 is a top plan view of the modification shown in FIGURE 6.

Referring now more particularly to the drawings, there is shown therein a tobacco priming device 8 embodying the principles of the present invention. This priming device is adapted to be moved through a tobacco field by means of a suitable vehicle generally indicated at 10 and fragmentarily shown in FIGURE 3. The priming device may be mounted upon a propelling vehicle 10 such as that disclosed in the Wilson Patent No. 2,816,411. Alternatively, the priming device may be adapted to be drawn through a tobacco field by means of a tractor or other such vehicle. Any suitable means may be utilized to mount the device on the vehicle, the preferred arrangement employing a frame means, such as indicated at 18, which will provide for vertical adjustment. Such a structure is shown in FIGURE 3. In this manner, a swath of tobacco leaves may be removed from various levels on the tobacco stalk, the lowest leaves being removed first and the higher leaves being removed as they ripen.

The tobacco priming device 8 of the present invention comprises, in general, a pair of parallel defoliating units 12 and 14. As shown, these units are arranged to impart a combined action upon the tobacco leaves as the device is moved along the row of plants. These units are arranged to sever the leaves from the stalks in an upward cutting motion at a point adjacent their connection with the stalks, the knives or cutting elements being arranged to cut the leaves extending from the plant both parallel to the rows and perpendicular to the row of stalks. The motion of the defoliating units 12 and 14 is such as to carry the cut leaves over the units, depositing them on suitable conveyors 38 which carry them to a central collecting station or bin (not shown).

Since the defoliating units 12 and 14 are identical except that they are arranged to operate in complementary fashion, a description of one will suffice in order to present a complete understanding of both units. Each of the defoliating units 12 and 14 are located on the frame means 18 (see FIGURE 3) and held in place by means of brackets 20 and 22 on said platform. The position of the defoliating unit 12 on the frame means 18 is adjustable so as to allow removal of leaves at various heights of a tobacco stalk. As best shown in FIGURES 1 and 2, the rearward bracket 22 is located some distance behind and above the forward bracket 20. Extending upwardly and rearwardly between the brackets 20 and 22 is a stationary U-shaped shaft 24. The free end of the lower leg of the shaft 24 is bent in a direction extending slightly upwardly and forwardly, as indicated at 25, and is fixedly secured to the bracket 20, as by a clamp 23. The free end of the rearward leg of the U-shaped shaft is bent in a direction extending slightly downwardly and rearwardly, as indicated at 27, and is fixedly attached to the bracket 22. Rotatably mounted on the bent ends 25 and 27 of the shaft 24 is a pair of elements in the form of circular plate members 30 and 32 respectively. It will be noted that the circular plate members are rotatable about parallel vertically spaced axes which extend slightly downwardly and rearwardly.

A plurality of members in the form of elongated rods 34 are connected to the members 30 and 32 at equally-spaced intervals about the periphery thereof by stub shaft elements 42 and 44. Elements 42 and 44 are mounted in members 30 and 32 so as to rotate freely about an axis generally parallel to the axis of said members 30 and 32. Each stub shaft element 42 and 44 is adapted to receive an adjacent transverse bent end of the associated elongated rod 34 within an opening which is generally perpendicular to the axis about which elements 42 and 44 rotate, and the bent ends of the rods 34 are free to oscillate within this opening. It is to be noted that since the axis of members 30 and 32 lie in different planes, rods 34 will maintain their orientation throughout their circular travel as members 30 and 32 are rotated.

The elongated rods 34 have a plurality of shorter rod members 46 extending outwardly therefrom and perpendicularly thereto at intervals equally-spaced along their length. The rod members 46 all lie in a generally horizontal plane. Suitably fixed along the upper side of each of the elongated rods 34, as by welding or other suitable means, is a vertically disposed knife or cutting element 16 having a sharp upper cutting edge. Extending perpendicularly outwardly from each of the knife elements 16 and attached, also by welding or other suitable means, to the upper sides of the shorter rod members 46 are similar knives or cutting elements 48. It is to be noted that the bight portion of the U-shaped shaft 24 is offset so as not to interfere with the movement of the rod member 46 and associated knives 48.

A spur gear 52 is suitably fixed to the rotary member 30 of each defoliating unit and is maintained in axially spaced relation therefrom by means of a plurality of spacer elements 50 positioned at spaced intervals about the periphery thereof. Each spur gear 52 meshes with a cooperating gear 54 rotatably mounted at right angles thereto which receives motive power through a shaft 56. A gasoline engine or other suitable power means (not shown) for driving each shaft 56 is located on the propelling vehicle.

Secured to each bracket member 20 at the forward end thereof is a generally cone-shaped guide means 58 for guiding the tobacco plant into the defoliating mechanism as shown in FIGURE 1.

The device of the present invention is moved along a row of tobacco plants by a suitable propelling unit in the manner described in the aforesaid patent to Wilson, No. 2,816,411, with defoliating units 12 and 14 disposed on opposite sides of the row of tobacco plants in upwardly and forwardly inclined relation thereto. Guide means 58 attached to the brackets 20 at the forward end of the defoliating units 12 and 14 direct the stalks between the two driven units. Preferably, the units are disposed at an inclination of approximately 20° to the horizontal so that the lower end of the units will initially engage the lowermost portion of the swath to be removed, with removal proceeding from bottom to top. The leaves of tobacco plants ripen from bottom to top so that it is necessary to remove the lower leaves first; the upper leaves are subsequently removed as they ripen. Accordingly, it is preferable that the device be carried for vertical adjustment by the propelling vehicle so that progressively higher swaths of leaves may be removed from the stalks as the leaves ripen.

In operation, the shafts 56, which receives power from a gasoline engine or other suitable power means located on the propelling vehicle, drive gears 54, which in turn drive gears 52. The spur gears 52 which are connected to the respective members 30 transmit rotational motion to the respective defoliating units 12 and 14.

The elongated rods 34 of each unit are thereby caused to revolve about an imaginary axis. As viewed from the forward end, the defoliating unit 12 rotates in a counter-clockwise direction while defoliating unit 14 rotates in a clockwise direction. The rod member 46 on defoliating unit 12 with their attached cutting elements 48 intermesh with like elements on defoliating unit 14, each set of rod members and cutting elements moving in an upward direction along the line at which they intermesh.

The motion of each of the associated rod members 34 and 46 is such that the cutting elements 16 and 48 attached thereto move into engagement with the tobacco leaves with a substtantially translational movement. At the same time that the rod members 34 and 46 engage the stalks, the knives move in an upward cutting action severing the leaves from the stalks at the base portion thereof. It should be noted that the rod members are of greater diameter than the thickness of the knives or cutting elements 16 and 48; in this manner, the knives are prevented from causing any damage to the stalks in the process.

It should further be noted that the knives have greater depth than the diameter of the leaf stem. The leaf stem diameter of the average tobacco plant is approximately ¾ of an inch. Therefore a blade one inch in depth will cut through the leaf stem before the rod member backing the blade engages the cut section of the leaf stem, and the leaf is cut cleanly rather than being partially torn from the stalk. The leaves which extend from the stalks in a direction generally parallel to the rows of plants are severed by cutting elements 48, and the leaves which extend from the stalks in a direction generally perpendicular to the rows of plants are severed by cutting elements 16. After the leaves are cut from the stalk, they are carried up over the defoliating units and disposed on to the conveyor belts disposed therebelow which carry them to a central collecting station.

While the above-described apparatus will operate satisfactorily to cut those leaves which extend from the tobacco stalk in directions which are generally parallel or perpendicular to the tobacco rows, some difficulty has been experienced in severing small leaves which grow out from the stalk in odd directions. FIGURES 6 and 7 illustrate a modification of the cutting apparatus which has overcome this difficulty. In place of the shorter rod members 46 of the device shown in FIGURE 3, each elongated rod member 34 has attached thereto, as by welding or other suitable means, a plurality of U-shaped bars 62 with U-shaped cutting elements 64 attached thereto.

While the operation of the knife unit herein described has been found to be much superior than previous defoliating means for removing leaves from the tips of the tobacco stalk, it has also proven to be competitive with these other defoliating means for removing leaves at other levels of the tobacco plant as well.

I have therefore disclosed a tobacco harvester having new and improved defoliating means including cutting elements which employ an echelon finger-bar arrangement with knives attached thereto for cutting the leaves from the tobacco stalk in an upward direction.

It is to be understood that the form of the invention herewith shown and described is to be taken as a preferred embodiment of the same and that various changes may be made without departing from the spirit of the invention or the scope of the appended claims.

What is claimed is:

1. Apparatus for priming tobacco plants having stalks and leaves extending outwardly therefrom arranged to be mounted on a vehicle frame movable along a row of such plants comprising a pair of defoliating units, means operatively associated with said defoliating units adapted to mount the same on the vehicle frame in longitudinally inclined spaced transverse relation to permit passage of the tobacco plants therebetween during the movement of the vehicle frame along the row of plants, at least one of said units including a plurality of members having cutting blade means thereon and means mounting said members for movement in an endless path which includes inward movement toward the stalks to bring said cutting blade means into cutting position in vertically spaced relation to the leaves adjacent the stalks, vertical movement to sever the leaves engaged thereby adjacent the stalks and outward movement to retract the cutting blade means from adjacent the stalks, said cutting blade means having sharp cutting edges facing in the direction of said vertical severing movement and extending generally in directions both longitudinal and transverse with respect to the row of plants during said vertical severing movement so that said cutting edges will engage the leaves of the plants which extend both longitudinally and transversely outwardly of the stalks with respect to the row on the side thereof of said one unit.

2. Apparatus for priming tobacco plants having stalks and leaves extending outwardly therefrom arranged to be mounted on a vehicle frame movable along a row of such plants comprising a pair of defoliating units, means operatively associated with said defoliating units adapted to mount the same on the vehicle frame in longitudinally inclined space transverse relation to permit passage of the tobacco plants therebetween during the movement of the vehicle frame along the row of plants, each of said units comprising a plurality of members having upwardly facing cutting blade means thereon and means mounting said members for movement in an endless path which includes inward movement toward the stalks to bring said cutting blade means into cutting position below the leaves adjacent the stalks, upward movement to sever the leaves engaged thereby adjacent the stalks and outward movement to retract the cutting blade means from adjacent the stalks, the cutting blade means of each of said units having upper sharp cutting edges extending generally in directions both longitudinal and transverse with respect to the row of plants during said upward severing movement so that the cutting edges will engage the leaves of the plants which extend both longitudinally and transversely outwardly of the stalks with respect to the row on both sides thereof.

3. Apparatus as defined in claim 2 wherein each of said members includes portions spaced vertically below the associated cutting edges, said portions including continuous surfaces spaced from the cutting edges in a direction toward the plants whose leaves are to be severed by said cutting edges so that said continuous blunt surfaces will engage the stalk of the plants and prevent the cutting edges from severing the same.

4. Apparatus for priming tobacco plants having stalks and leaves extending outwardly therefrom comprising a vehicle frame movable along a row of tobacco plants, a pair of intermeshing defoliating units mounted on said frame in spaced side-by-side relation for vertical adjustment with respect to said frame, guide means secured to the forward end of each defoliating unit to direct the plants into association therewith during the movement of said vehicle frame along the row, each of said defoliating units including a forward rotary element mounted on said frame for rotation about a first axis, a rearward rotary element mounted on said frame in a position spaced rearwardly and upwardly with respect to said forward rotary element for rotation about a second axis parallel to said first axis, a plurality of elongated members extending between said rotary elements, means mounting the forward ends of said elongated members on said forward rotary element for rotational movement about axes parallel to said first axis and spaced circumferentially thereabout, means mounting the rearward ends of said elongated members on said rearward rotary element for rotational movement about axes parallel with said second axis and spaced circumferentially thereabout, each of said elongated members including cutting blade means thereon having sharp upper cutting edges extending generally in directions both longitudinal and transverse with respect to the row of plants, and driven means operatively connected with at least one rotary element of each unit for rotating said element and effecting an orbital translational movement of the elongated members of each unit in a direction such that the cutting edges of each elongated member will be moved inwardly toward the stalks, upwardly to sever the leaves from the stalks and then outwardly to carry the severed leaves away from the stalks.

5. Apparatus as defined in claim 4 wherein said means for mounting the forward and rearward ends of said elongated members on said forward and rearward rotary elements each comprises a stub shaft element journalled in the associated rotary element for rotary movement about the associated axis and means connecting said stub shaft element with the associated end of the associated elongated member for pivotal movement about an axis intersecting and perpendicular to the axis of said stub shaft element.

6. Apparatus as defined in claim 4 wherein each of said elongated members comprises an elongated rod having the forward and rearward end portions thereof bent in a direction generally perpendicular thereto.

7. Apparatus as defined in claim 6 wherein each of said elongated rods includes a plurality of longitudinally spaced relatively short rod members extending transversely outwardly therefrom, said cutting blade means being secured along its lower edge to said elongated rods and to said rod members at the central upper portions thereof.

8. Apparatus as defined in claim 6 wherein said cutting blade means comprises a series of interconnected U-shaped cutting elements secured to each of said elongated rods and extending transversely with respect thereto, each of said U-shaped cutting elements including portions disposed adjacent the lower edges thereof providing continuous blunt surfaces extending transversely toward the plants for engaging the stalks of the plants and preventing the cutting edges from severing the same.

References Cited in the file of this patent

UNITED STATES PATENTS 2,816,411    Wilson  ---------------- Dec. 17, 1957
2,834,173    Wilson  ---------------- May 13, 1958